United States Patent [19]
Eisenhardt

[11] 3,741,137
[45] June 26, 1973

[54] INCORPORATOR
[75] Inventor: Fred W. Eisenhardt, Fargo, N. Dak.
[73] Assignee: Alloway Manufacturing Inc., Fargo, N. Dak.
[22] Filed: Nov. 19, 1971
[21] Appl. No.: 200,431

[52] U.S. Cl. .................................. 111/6, 172/512
[51] Int. Cl. ............................................ A01c 23/02
[58] Field of Search ..................... 111/6, 7; 172/512, 172/707, 135, 508, 509, 643

[56] References Cited
UNITED STATES PATENTS

| 1,025,118 | 5/1912 | Brand | 172/509 X |
| 3,194,193 | 7/1965 | Walters | 111/6 |
| 3,367,293 | 2/1968 | Cox | 111/6 |
| 2,417,597 | 3/1947 | Hill | 172/512 |
| 2,090,739 | 8/1937 | Wyss | 172/707 |
| 354,978 | 12/1886 | Gentry | 172/512 |
| 3,194,194 | 7/1965 | Phelps | 111/6 |
| 3,155,169 | 11/1964 | Mattson et al. | 172/512 |

Primary Examiner—Robert E. Pulfrey
Assistant Examiner—Stephen C. Pellegrino
Attorney—Richard O. Bartz et al.

[57] ABSTRACT

A ground working implement operable to mix liquid or granular materials, as fertilizers, herbicides and like agricultural chemicals, into the surface of the soil. The implement has an inverted, generally U-shaped housing carrying a plurality of spring biased earth working members, as spring teeth. In one form, parallel linkage means pivotally mounts the housing on a support. Wheel structure connected with arms to the housing is used to adjust the earth working depth of the teeth. In another form, an upright standard and clamp adjustably mounts the housing on a tool bar to adjust the earth working depth of the teeth. The material is discharged through a nozzle mounted on the front of the housing whereby the implement, as it moves in a forward direction, discharges the material onto the soil. The material is worked into the soil with the teeth.

21 Claims, 10 Drawing Figures

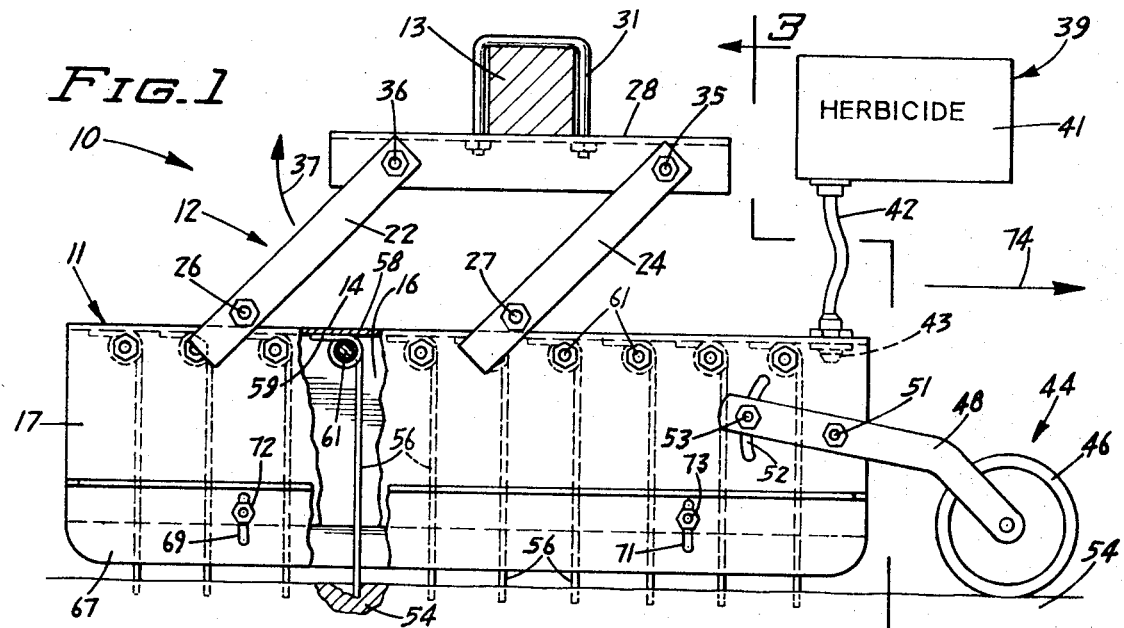
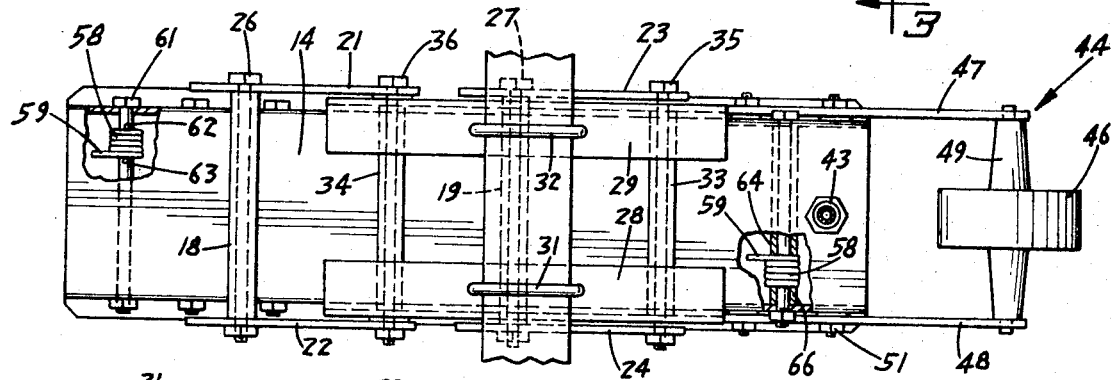
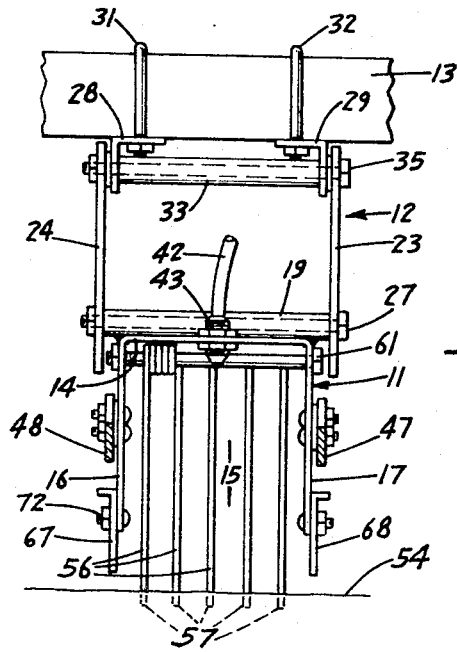

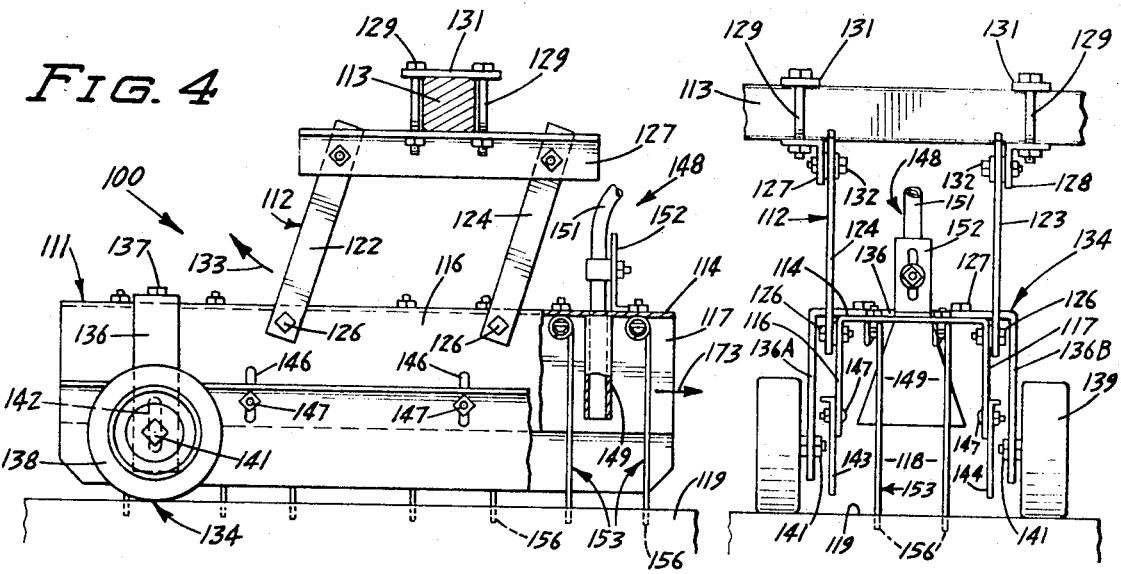
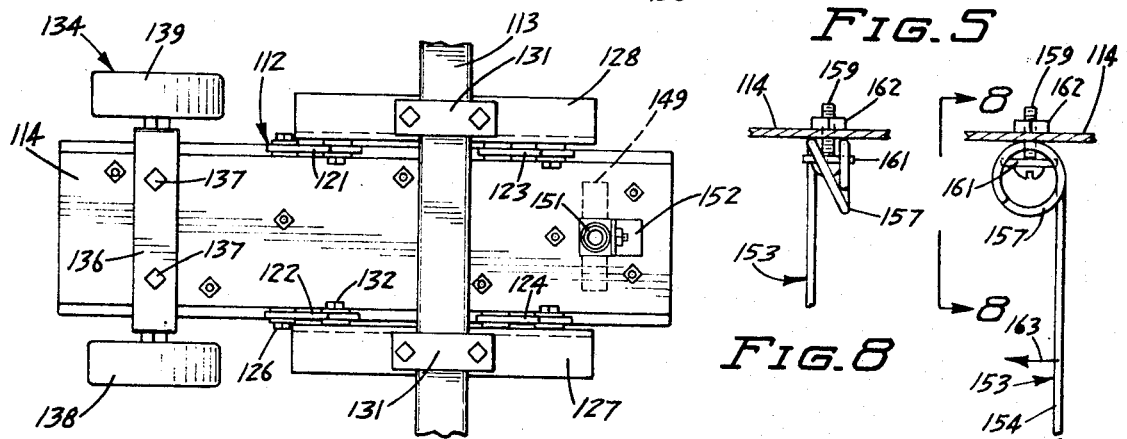
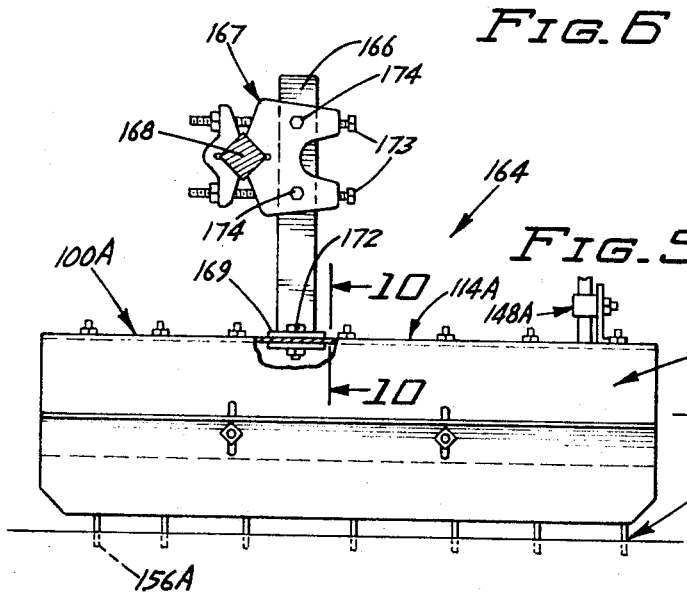
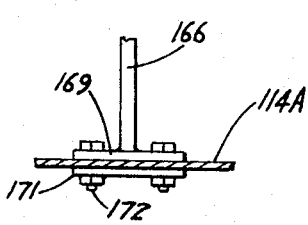
INVENTOR.
FRED W. EISENHARDT
BY Burd, Braddock & Bartz
ATTORNEYS

INCORPORATOR

BACKGROUND OF THE INVENTION

Agricultural chemicals, as herbicides and fertilizers, are applied to the soil in either a broadcast or row operation. The effectiveness of these chemicals is enhanced when the chemicals are mixed with the soil. The use of earth working tools to mix chemicals with the soil is discharged in U. S. Pat. No. 3,194,193 and U. S. Pat. No. 3,194,194. Power driven, rotary hoes are operable to mix liquid herbicide in the soil. Shield structures have been used to direct agricultural chemicals to the soil after the soil has been worked. U. S. Pat. No. 2,515,317 discloses a shield structure and means to inject liquid into the soil. A plurality of rotating discs located in front of the shield structure loosen and work the soil prior to application of the chemicals.

SUMMARY OF THE INVENTION

The invention is directed to an apparatus or incorporator for dispensing and mixing material, as chemical fluids and particulate or granular material, into the soil. The apparatus confines the material to a relatively narrow band so that it is mixed with the soil in an elongated row. The material is confined with an inverted, generally U-shaped housing which carries a plurality of downwardly directed earth working members. The earth working members can be spring biased, generally vertical fingers or teeth that extend below the lower edges of the side walls of the housing into the soil. As the fingers work the soil, some of the soil is moved upwardly and suspended in the air. The material is introduced into the suspended soil to provide for effective incorporation of material with the soil. A linkage means connects the housing to a fixed support, as a transverse tool bar or planter member. The linkage means is operable to permit the housing to move toward and away from the soil. The earth working depth of the members is controlled with a wheel assembly secured to the housing. The wheel assembly is adjustably mounted on the housing. In one form of the incorporator, an upright standard is used with a clamp to mount the incorporator on a support. A dispensing means in the form of a nozzle carried on a forward end of the housing is used to direct the material onto the soil immediately forward of the earth working members.

IN THE DRAWINGS:

FIG. 1 is a side elevational view with parts broken away of the material applicator of the invention;

FIG. 2 is a top plan view with parts broken away of FIG. 1;

FIG. 3 is a sectional view taken along the line 3—3 of FIG. 1;

FIG. 4 is a side elevational view with parts broken away, of a modification of the incorporator of the invention;

FIG. 5 is a forward end elevational view of the incorporator of FIG. 4;

FIG. 6 is a top plan view of FIG. 4;

FIG. 7 is an enlarged side elevational view of the ground working member and attachment thereof to the housing;

FIG. 8 is a sectional view taken along the line 8—8 of FIG. 7;

FIG. 9 is a side elevational view, with parts broken away of a further modification of the incorporator of the invention; and FIG. 10 is an enlarged sectional view taken along the line 10—10 of FIG. 9.

Referring to the drawings, there is shown in FIGS. 1 to 3 an incorporator or apparatus for mixing agricultural chemicals into the soil, indicated generally at 10. The chemicals can be liquid herbicides, fertilizers, insecticides, and the like. The chemicals can also be granular or particulate matter, as pulverized lime, fertilizers, and the like.

Incorporator 10 has an inverted, generally U-shaped housing 11 extending in a longitudinal direction. A floating parallel linkage assembly indicated generally at 12 connects the housing to a support 13. The support 13 can be a transverse tool bar mounted on a tractor or a part of the frame of an implement, as a planter or cultivator.

Housing 11 has a generally flat, horizontal and elongated top wall 14 joined at its opposite sides to downwardly directed side walls 16 and 17. The housing 11 has a generally inverted channel or inverted U shape. The open side of the housing 11 faces the soil and forms therewith a passageway or tunnel 15 open to the top of the soil 54.

A pair of transverse tubes or pipes 18 and 19 are secured to the top 14. Linkage assembly 12 has a plurality of arms or links 21, 22, 23 and 24 that extend downwardly and rearwardly from the support 13. A transverse bolt 26, projected through the lower ends of arms 21 and 22 and through the tube 18, pivotally mounts the arms on the housing. In a similar manner, a transverse bolt 27, extended through the lower ends of arms 23 and 24 and through tube 19, pivotally mounts the arms on the housing.

A pair of longitudinal, fixed angle members 28 and 29 are fastened to the support 13 with U-bolts 31 and 32. The outer opposite ends of the members 28 and 29 carry transverse spacer tubes 33 and 34. A bolt 35, projected through suitable holes in members 28 and 29 and tube 33, pivotally mounts the upper ends of links 23 and 24 to the members 28 and 29. In a similar manner, a bolt 36, extended through the members 28 and 29 and tube 34, pivotally mounts the upper ends of links 21 and 22 to the members 28 and 29. The arms 21, 22, 23 and 24, pivotally mounted to the fixed members 28 and 29 and the housing 11, permit the housing to swing upwardly and rearwardly, as indicated by arrow 37, away from the soil. This permits the housing 11 to float over obstacles, as trash, rocks, and the like.

The chemical materials are discharged onto the top of the soil adjacent the forward end of the housing 11 by a dispenser unit indicated generally at 39. The dispenser unit 39 includes a source or supply 41 of the chemical material. This source can be a tank and pump or hopper and auger operable to deliver the material to a line 42. The line 42 directs the chemical material to a nozzle 43 mounted on the central portion of the front of the top 14 of the housing 11. The nozzle 43 directs the chemical material onto the soil. The nozzle, being located below the top 14 and between the forward portions of the side walls 16 and 17, confines the chemical material to a relatively narrow band of soil along the open lower end, or bottom, of housing 11. Other types of devices including dispensing or discharge structure for discharging material onto the ground can be used with housing 11.

A wheel assembly, indicated generally at 44, is secured to the front of the housing 11 to support the housing above the ground 54. Wheel assembly 44 comprises a generally upright wheel 46 rotatable about a generally transverse axis. Projected rearwardly and upwardly from the wheel 46 are a pair of arms or support members 47 and 48. The forward ends of the arms 47 and 48 support a transverse axle 49 for rotatably carrying the wheel 46. Pivot members 51, shown as nut and bolt assemblies, pivotally connect mid-portions of arms 47 and 48 to the front of side walls 16 and 17 so that the vertical position of the wheel 46 can be adjusted relative to the housing 11. The adjusted position of the wheel is held by locking the rear ends of the arms 47 and 48 to the side walls 16 and 17. The side walls 16 and 17 have arcuate slots 52 for accommodating locking nut and bolt assemblies 53, used to secure the arms in their adjusted positions to side walls 16 and 17. By raising or lowering the position of wheel 46 relative to the housing, the working depth of the earth working members 56 can be adjusted.

The earth working members 56 are elongated teeth or fingers that have lower rod-like ends 57 that work the top of the soil 54 by turning the soil and moving soil upward into suspension with the air. The earth working members, shown in FIG. 3, are located between the side walls 16 and 17 and are longitudinally spaced along the length of the housing 11. The members 56 are not in longitudinal alignment with each other, so that all of the soil between the side walls 16 and 17 is worked. The members 56 are identical in structure. The following description is limited to one member 56.

The upper end of member 56 is shaped in a coiled torsion configuration, or spring, 58 that has a generally rearwardly directed horizontal end 59. End 59 is engageable with the bottom side of the top 14. A transverse bolt 61 extends through the coil spring 58 to mount the spring and earth working member on the housing. The bolt 61 extends through suitable holds in the upper portions of the side walls 16 and 17.

As shown in FIG. 2, the bolt 61 can have stops or abutments 62 and 63 that determine the transverse position of spring 58. As an alternative structure, sleeves 64 and 66 of varying length can be used to fix the transverse position of the spring 58. The sleeves 64 and 66 can be replaced with nuts threaded onto the bolt to fix the transverse position of the spring relative to the bolt.

As shown in FIGS. 1 and 3, the side walls 16 and 17 are provided with downwardly directed side wall extension plates 67 and 68. The plates 67 and 68 are used to extend the effective height of the side walls and control the amount of soil that is allowed to move under the side walls in operation. The plates 67 and 68 have upwardly directed slots 69 and 71 to accommodate attaching nut and bolt assemblies 72 and 73. The slots 69 and 71 permit the plates 67 and 68 to be vertically positioned on the side walls 16 and 17.

In use, the chemical applicator 10 is mounted on the support 13 with the wheel assembly 44 in a forward direction, as indicated by arrow 74. The wheel 46 is adjusted relative to the housing 11 to regulate the working depth of the earth working members or fingers 56. The amount of soil that is allowed to move under side walls 16 and 17 is controlled by the use of side wall extension plates 67 and 68. The chemical material is discharged through the nozzle or dispenser 43 onto the soil 54 in the forward portion of the housing 11. The earth working fingers 56 work the soil in series and move some soil upwardly to suspend soil in the air to thoroughly mix the chemical material with the top layer of soil. Chemical materials are incorporated into the suspended soil. The chemical material is confined to the band or space between the side walls 16 and 17, thus forming a row of treated soil. The earth working members 56, being biased by the coil spring 58, can flex in a rearward direction if they strike an obstruction, as a rock or clump of soil. Each earth working member, being biased independently, does not disrupt the functioning of the other members as it rides over an obstruction. The entire housing 11 along with the earth working members can also move upwardly away from the soil as floating linkage assembly 12 permits the housing to ride over trash or soil buildup.

Referring to FIGS. 4 to 6, there is shown a modification of the applicator or incorporator of the invention indicated generally at 100. The incorporator 100 is operable to mix agricultural chemicals, as liquid herbicides, fertilizers, insecticides and granular material into the soil. The incorporator 100 has an inverted, generally U-shaped housing 111 extended in a linear longitudinal direction. A floating linkage assembly indicated generally at 112 connects the housing to a support 113. The support 113 can be a transverse tool bar mounted on a tractor or part of the frame of an implement, as a planter or cultivator.

Housing 111 has a generally flat, horizontal top wall 114 joined at its opposite sides to downwardly directed side walls 116 and 117. The open side, or bottom, of the housing faces the soil and forms therewith a longitudinal passageway or tunnel 118 open to the top of the soil 119. The dispensing and mixing of the agricultural chemicals with the soil is achieved in the tunnel 118.

Linkage assembly 112 comprises upwardly directed arms or links 121, 122, 123 and 124. Nut and bolt assemblies 126 pivotally mount the lower ends of the links to the side walls 116 and 117 of the housing 111. Located above the housing is a pair of angle members 127 and 128, Bolts 129, cooperating with a plate 131 function to clamp the angle members 127 and 128 to the support 113. The upper ends of the links 121, 122, 123 and 124 are pivotally connected to the angle members 127 and 128 with nut and bolt assemblies 132. As shown in FIG. 6, the upper ends of links 121 and 123 are pivotally connected to opposite ends of the angle member 128. The upper ends of links 122 and 124 are pivotally connected to opposite ends of angle member 127. The parallel linkage assembly 112 permits the housing 111 to swing upwardly and rearwardly in the direction of the arrow 133 so that it can ride over trash or other obstructions on the ground. The housing 111 will return to its ground working position as soon as it has passed over the trash or obstruction.

A wheel assembly indicated generally at 134, mounted on the rear portion of the housing, functions to space the housing a short distance from the surface of the soil 119. Wheel assembly 134 has an inverted, generally U-shaped bracket 136 extended over the housing 111. The base of the bracket 136 is secured to the top wall 114 of the housing with a pair of nut and bolt assemblies 137. As shown in FIG. 5, the side portions 136A and 136B of the bracket 136 extend downwardly and are spaced outwardly of the side walls 116 and 117. Wheels 138 and 139 are rotatably mounted on the lower ends of the side portions with axles 141. The axles 141 have portions extending through elongated upright slots 142. The slots 142 permit vertical adjustment of the wheels relative to the bracket, thereby allowing for adjustment of the height of the housing relative to the surface or top of the soil 119.

As shown in FIGS. 4 and 5, the side walls 116 and 117 are provided with downwardly directed side wall extension plates 143 and 144. The plates 143 and 144 are generally flat members positioned in a vertical plane and are used to extend the effective height of the side walls to control the amount of soil that is allowed to move under the side walls in operation. The side wall extension plates 143 and 144 and the adjacent side walls 116 and 117 have upwardly directed slots 146 for accommodating nut and bolt assemblies 147 to adjustably secure the side wall extension plates 143 and 144 to the housing side walls 116 and 117, respectively.

The chemical material is discharged on top of the soil adjacent the forward end of the housing 111 by a dispenser unit indicated generally at 148. The dispenser unit 148 includes a source of supply of chemical material which is delivered via a line or hose 151 to a nozzle 149. The source of supply of chemicals may include a tank or container and a suitable delivery means, as a pump, to direct the chemicals under pressure into line 151. The nozzle 149 has a body portion which extends downwardly and diverges outwardly so as to direct the chemicals over the width of the passageway 118 onto the soil. The nozzle 149, being located between the top 114 and the forward portions of the side walls 116 and 117 confines the chemicals to a relatively narrow band of soil along the open lower end of the housing 111. The nozzle 149 is supported on top wall 114 with a bracket 152. The bracket 152 has an elongated upright slot to permit vertical adjustment of the nozzle 149.

A plurality of downwardly directed earth working members indicated generally at 153 are located within the housing 111. The earth working members 153 function to work the soil to mix the chemicals into the top layer of the soil. The earth working members 153 are arranged in spaced, staggered relation to each other along the length of the housing and thereby sequentially work and turn the soil as the incorporator moves. The front two earth working members are located forward or in front of the nozzle 149. The earth working members 153 are identical in structure. The following description is limited to one earth working member, as shown in FIGS. 7 and 8.

The earth working members each comprise an elongated linear rod, finger or spring tooth 154 having a lower end 156. As shown in FIGS. 4 and 5, in the ground working position, the lower end 156 extends to the top of the soil 119. A coil spring 157 is integral with the upper end of the rod. The spring 157 has a space between the coils sufficient to accommodate a bolt 159. A washer 161 located within the spring 157 and engageable with the spring functions to anchor the bolt on the spring. The bolt 159 extends through a suitable hole in the top wall 114. A nut 162 threaded on bolt 159 holds the spring in a fixed assembly relation with the top wall 114. The spring 157 and the yieldable characteristics of the rod 154 permit the rod 154 to move rearwardly in the direction of the arrow 163 if the end 156 strikes an obstruction, as a rock or the like, and move back to its vertical position after it has passed over the obstruction.

Referring to FIGS. 9 and 10, there is shown a further modification of the incorporator indicated generally at 164. The incorporator 164 has a housing and earth working tool structure that is identical to the housing and earth working tool structure shown in the incorporator 100. The parts of the incorporator 164 that are identical to the incorporator 100 are identified with identical reference numerals having the suffix "A." The housing 111A is held in an operative position with an upright standard 166 and clamp 167. The clamp 167 is attached to a tool bar or similar support 168. Details of the clamp 167 are disclosed in U.S. Pat. No. 3,642,333.

A cross bar or cross plate 169 is secured to the lower end of the standard. Located adjacent the inside of the housing wall 114A is a plate 171. Nut and bolt assemblies 172 secure the cross bar 169 and plate 171 to the top wall 114A. The standard 166 is vertically adjustable in the clamp 167 through adjustment of the edge clamp bolts 173 and side clamp bolts 174.

In use, the incorporator of FIGS. 4 to 8 is mountable on most implements, as cultivators and the like, by use of parallel linkage assembly 112. The standard 166 and tool bar clamp 167 are used to mount the incorporator directly on a tool bar or similar implement support. When the incorporator is moved in the forward direction, as indicated by arrows 173 and 173A, the earth working members 153 penetrate the soil and hold a certain amount of soil in suspension. The material to be mixed into the soil is directed toward the soil and into the suspended soil. The series of earth working members continue to work the soil and confine the worked soil and material to a band or area determined by the width of the housing. The amount of soil that is permitted to move under the side walls 116 and 117 is controlled by the use of side wall extension plates 143 and 144. The closer the extension plates 143 and 144 are to the surface of the soil, the less soil moves under the plates. In the event the housing or earth working members 153 strike an obstruction, the incorporator can move upwardly and rearwardly in the direction of the arrow 133 without disrupting the function of incorporating material into the soil. As soon as the obstruction is passed, the incorporator will move back to its normal position. The wheels 138 function to hold the housing 111 above the soil and thereby control the earth working depth of the earth working members 154.

While there has been shown and described preferred embodiments of the invention, it is understood that various changes, substitutions and uses can be made by those skilled in the art without departing from the spirit of the invention. The invention is defined in the following claims.

The embodiments of the invention in which an exclusive property or privilege is claimed are defined as follows:

1. An apparatus for incorporating material into the soil comprising
    an inverted, generally U-shaped housing having a generally horizontal top wall, downwardly directed side walls connected to the top wall, an open front end, an open rear end, and an open bottom;
    a plurality of downwardly directed earth working members located between said side walls, said members comprising generally upright fingers having lower ends adapted to work the surface of the soil adjacent the open bottom of the housing;
    means mounting the fingers on the housing with a portion of each finger engaging the top wall;

means centrally mounted on said housing for directing material onto the soil adjacent the open front end of the housing;

linkage means connected to the housing adapted to connect the housing to a support whereby the housing can move toward and away from the soil; and wheel mean connected to the housing engageable with the soil to support the housing above the soil.

2. The apparatus of claim 1 wherein said linkage means comprises a plurality of links having upper ends and lower ends, first means pivotally connecting the lower ends of the links to the housing, and second means pivotally connecting the upper ends of the links to the support.

3. The apparatus of claim 2 wherein said second means comprises rigid, generally longitudinal members secured to the support, and pivot members connecting the upper ends of the links to the longitudinal members.

4. The apparatus of claim 1 wherein each of said earth working members is a finger having a coil spring at the upper end thereof, said coil spring having an end engageable with the top wall of the housing to thereby bias the finger in a generally vertical direction.

5. The apparatus of claim 1 wherein said plurality of downwardly directed earth working members are longitudinally spaced from each other along the length of the housing.

6. The apparatus of claim 1 wherein said wheel means comprises support means secured to the housing, and a generally upright wheel rotatably mounted on said support means.

7. The apparatus of claim 6 including means to pivotally mount and adjustably hold the support means on the housing whereby the position of the wheel can be adjusted relative to the housing.

8. The apparatus of claim 1 wherein the wheel means includes a bracket secured to the housing having support portions located adjacent opposite sides of the housing and ground engaging wheels rotatably mounted on said support portions.

9. The apparatus of claim 1 including side wall extension plate means adjustably mounted on the side walls of the housing to extend the effective height of the side walls.

10. The apparatus of claim 1 wherein said lower ends of the earth working members project downwardly below the lower edges of the side walls.

11. The apparatus of claim 1 including means biasing said earth working members in a generally vertical direction.

12. The apparatus of claim 10 wherein said biasing means are springs.

13. The apparatus of claim 10 wherein each of said biasing means is a coil spring secured to an earth working member, said means mounting the earth working member on the housing being a transverse member extended through the coil spring.

14. An apparatus for incorporating material into the soil comprising:

an inverted, generally U-shaped housing having a generally horizontal top wall, downwardly directed side walls connected to the top wall, an open front end, and open rear end, and an open bottom;

a plurality of downwardly directed earth working members located between said side walls, said members comprising generally upright fingers having lower portions adapted to work the surface of the soil adjacent the open bottom of the housing, means mounting the fingers on the housing with a portion of each finger engaging the top wall;

material dispensing means on said housing for directing material toward the soil between the side walls adjacent the open front end of the housing; and means connected to the housing adapted to connect the housing to a support means to support the housing above the soil.

15. The apparatus of claim 14 wherein: said downwardly directed earth working members have spring means to yieldably hold the fingers in generally upright positions.

16. The apparatus of claim 15 wherein: each spring means is a coil spring having one end engageable with the top wall and a second end connected to the finger.

17. The apparatus of claim 15 wherein: the means mounting the members on the housing comprise holding means engageable with the spring means to attach the spring means to the top wall of the housing.

18. The apparatus of claim 14 wherein: the material dispensing means includes a downwardly diverging member for directing the material toward the soil.

19. The apparatus of claim 14 wherein: the means adapted to connect the housing to a support comprises a parallel linkage assembly.

20. The apparatus of claim 14 wherein: the means connected to the housing adapted to connect the housing to the support comprises a generally upright standard secured to the top of the housing.

21. The apparatus of claim 14 including: side wall extension plate means adjustably mounted on the side walls of the housing to extend the effective height of the side wall.

* * * * *